United States Patent Office 3,009,777
Patented Nov. 21, 1961

3,009,777
PROCESS FOR PREPARING ZIRCONIUM SULPHATE SOLUTIONS
Arthur Wallace Evans, Nunthorpe, Middlesbrough, and Cyril Shore, West Hartlepool, England, assignors to British Titan Products Company Limited, Billingham, England, a corporation of the United Kingdom
No Drawing. Filed Apr. 14, 1958, Ser. No. 728,107
Claims priority, application Great Britain Apr. 18, 1957
14 Claims. (Cl. 23—117)

The invention relates to the production of aqueous solutions of zirconium salts of mineral acids, especially zirconium sulphate, from zirconiferous ores in which the zirconium is either combined with silica or is in intimate association therewith. The solution formed may be used for various purposes, including the coating of pigments, in order to improve their weathering and other properties such as resistance to discolouration in various media. In particular, the process of the invention is devised to produce a solution suitable for the coating of titanium oxide pigments and especially those of the rutile type.

Zirconium compounds occur in nature in various crystalline forms of which perhaps the purest, from the point of view of the zirconium content, is baddeleyite. This material, consisting essentially of zirconium oxide, may be attacked directly with mineral acid to produce a zirconium salt solution. Other crystalline forms in which zirconium compounds occur in nature include, in particular, zircon, some zirkites, and other bodies in which zirconium is combined or intimately associated with other elements of which silicon is frequently predominant. Most of these bodies, especially zircon, are apparently a form of combination of zirconia with silica and are sometimes described as zirconium silicates. It is this type to which the invention is especially applicable, although it is also applicable to other zirconium bearing ores including such wherein zirconia and silica may be present in intimate admixture.

It is well known that the silica combined or associated with zirconia in zirconiferous ores, especially zircon, may be removed by fusion of the pulverised ore with alkali metal hydroxides or carbonates. Following such reactions, the product of fusion, on cooling and lixiviation with water, contains the silica in a soluble form and the zirconium values mainly in the form of a complex zirconate residue. It is found, however, that such product of fusion on cooling tends to consist of a comparatively non-porous mass which may be in large pieces and which is not amenable either to subsequent leaching with water or to digestion with mineral acids. Even when such masses are broken down by divers means to comparatively small size particles, these processes prove to be uneconomical, not only because of the extra grinding process but because of the cost of the alkali involved.

It is the object of the present invention to provide a relatively simple, economical and easily conducted process whereby the zirconium values may be recovered in aqueous solution from zircon or other zirconiferous ores containing silica. This is accomplished by the partial replacement of the alkali metal compounds mentioned above by alkaline reacting compounds of the alkaline earth metals or of magnesium, or admixtures of such compounds. Particular examples of such compounds are the oxides, hydroxides and carbonates of the alkaline earth metals and magnesium.

By this means the roasting treatment may be conducted at temperatures at which the pulverised mixture remains in the solid phase, thereby avoiding the higher thermal states that would bring it into a sintered or fused condition. There is thus obtained a roasted product which cools to a soft friable condition in which it can be readily and efficiently digested with mineral acids, particularly sulphuric acid. This enables a high conversion to salts of the constituents present therein to be achieved and, more especially, the wining of the zirconium values as soluble products and the elimination of free and/or combined silica.

Accordingly the invention comprises a process for the treatment of zirconiferous materials preparatory to the recovery therefrom of zirconium values as soluble products, by admixing the finely divided material with an alkaline reacting alkali metal compound and an alkaline reacting compound of an alkaline earth metal or of magnesium, and roasting the mixture to effect reaction at temperatures below the fusion or sintering point of the mixture. It will be understood that more than one of either or both kinds of alkaline reacting compound may be used together.

The invention also comprises recovering the zirconium values by digesting the roasted material with a mineral acid, lixiviating with water and separating from the solution so obtained any undissolved material. Preferably there is used a slight excess of acid over and above that required to combine with the content of the alkali, the alkaline earth or magnesium, and the zirconium in order to produce a solution of zirconium salt, e.g. the sulphate $Zr(SO_4)_2$.

The total proportions of alkali and alkaline earth metal or magnesium compounds, used in the roasting, are preferably stoichiometric chemical equivalents of the zirconia plus silica contents, assuming the formation of the meta-salts, e.g. sodium meta-silicate and sodium meta-zirconate, and calcium meta-silicate and calcium meta-zirconate. The amount of the alkaline earth or magnesium compound may vary from 0.2 to 1.8 stoichiometric equivalent to one equivalent of the zirconia plus silica contents, e.g. to one equivalent of zircon, postulating its formula as $ZrSiO_4$.

A further feature of the process is the production by the acid attack on the roasted material either of a slurry, paste or powder, preferably the latter.

The following is a description of how the invention may be applied to the preparation of zirconium sulphate solutions from zircon. Such solutions will contain, in addition, soluble salts of the alkali metals such as sodium sulphate and, according to solubility, varying proportions of alkaline-earth metal sulphate or, if present, of magnesium sulphate. Other salts may be present, according to the presence of impurities in the raw materials and whether they are rendered soluble in process. The extent of such impurities will depend on the nature of the raw materials and, in turn, their desirability or otherwise will depend entirely on the purpose to which the ultimate solution is to be applied. When utilising normal types of ore, such as the average zircon mineral separated in the recovery of titaniferous materials or monazites and as normally available commercially, the solution obtained by use of mixtures of soda ash with appropriate alkaline earth or magnesium containing materials such as lime or a precipitated chalk it is possible to obtain zirconium sulphate solutions of water white clarity and substantially free from iron or other discolouring materials. The latter type of solution may, for instance, be used for incorporation with titanium dioxide pigments by precipitation thereon of insoluble zirconium compounds, by neutralisation of the solution in situ or by prior neutralisation and admixture with titanium oxide pigments. Such incorporation or coating enhances the value of such pigments especially those of the rutile type. Such coating operations may be conducted in a variety of ways which are well known in the art. The coating may be conducted by the addition, for instance, of various alkaline reacting compounds and the coating is usually completed at or around neutrality, i.e. in the region of pH 7, following which the product is dewatered and dried.

The preferred source material is zircon sand which corresponds closely to the formula $ZrO_2.SiO_2$ and has an approximate composition of 65% $ZrO_2$, 35% $SiO_2$. The zircon sand which normally has a mean weight particle size of $120\mu$ may be used as it is but for the purpose of this invention it is preferably ground to a state whereby it substantially all passes a 325 mesh sieve (ASTM). In a more preferred form the material should have a particle side substantially within the range $2$–$25\mu$, that is to say the mineral is preferably ground to such an extent that attack during the roasting operation is more efficient. Thus, in the treatment of the normal sand by the process of the invention, efficiencies of the order of only 30–40%, in respect of recovery of the zirconium values, may be attained. By grinding so that the material substantially all passes through a 325 mesh sieve efficiencies of the order of 60% or more are attainable. With the preferred degree of grinding, i.e. with the particles within the range 2 to $25\mu$ an efficiency of more than 80% may be attained.

The alkaline reacting alkali metal compound and the alkaline reacting alkaline earth or magnesium compound used in this invention should also be in a finely divided state. The amounts of these compounds are such that there is sufficient alkaline reacting material to combine with the zirconia and silica contents of the zircon so as to form the equivalent of the meta salts, i.e. meta silicate and meta zirconate, as represented by, for instance, $Na_2SiO_3$ and $Na_2ZrO_3$. Stated another way, the total equivalent of alkali metal and of alkaline earth or magnesium compound added will be equivalent to the total zirconia and silica contents. In the preferred embodiment the amount of alkali, alkaline earth and zircon employed in a mixture may be stoichiometrically represented as $Na_2O:CaO:ZrSiO_4::1:1:1$, but the proportion of alkali metal to alkaline earth (or magnesium) may be varied so that 0.1–1.9 molar parts of, for instance, alkali metal compound per the combined molar equivalent of zirconia and silica may be employed.

In carrying out the process, the ground zircon may be mixed with the finely divided alkali reacting alkali metal compound and alkaline reacting alkaline earth or magnesium compound, where possible, in the dry form, by any suitable dry mixing device, such as the drum type having lifting vanes. On the other hand, the materials may be admixed in aqueous slurry or paste form and in any suitable mixer such as, for instance, the dough mixer type, following which it may either be dried or fed to the roaster in the form of a paste. In all these mixing operations it is important that the mixture should be as intimate as possible.

The dry mixture or the wet paste as prepared above may be filled into crucibles and thereafter conveyed into a static or a moving hearth furnace. Alternatively, it may be fed direct into the base of a stationary hearth furnace. Preferably, however, it is fed into a type of rotary furnace either batch or continuous whereby it undergoes some mixing during the roasting operation. There are a variety of methods for the handling of this material but the invention is not restricted to any particular method in this respect. The roasting is conducted so that the charge is heated up to and held until reaction is substantially complete at a temperature somewhat above that at which reaction commences but at which sintering does not occur. The time of roasting will depend upon the temperature attained, that is to say the higher the temperature the shorter the period necessary to obtain the maximum reaction. Actual temperatures attained in the reaction will vary somewhat according to the composition of the raw material zircon employed. As the temperature at which sintering will take place will vary according to the type of ore employed, this temperature should be determined experimentally beforehand. It will also be noted that the temperature at which sintering takes place increases with decreasing particle size. The rate of reaction can be ascertained by examination of samples withdrawn from time to time, and a person skilled in the art, working with a particular ore, will be able to standardise his temperature of roasting and the duration thereof.

The roasted material, after cooling, is found to consist of a comparatively soft finely divided material which is suitable for digestion with acid. In this form it may contain alkali metal and/or alkaline earth or magnesium zirconates, alkali metal and/or alkaline earth or magnesium silicates, or mixtures, but generally the product of roasting is not appreciably soluble in water.

The roasted material is highly reactive to sulphuric acid; thus it will react with sulphuric acid over a wide range of concentrations and especially within a range of 25% up to 98% sulphuric acid by admixture in the cold. On adding sulphuric acid within said range heat is evolved which raises the temperature to near the boil or to temperatures of the order of 275° C., the latter depending on the acid strength involved. Whilst it is within the scope of the invention to conduct the attack within this comparatively wide range of sulphuric acid concentration, it is to be observed that when operating at 25% strength on a mix equivalent to $Na_2O:CaO:ZrSiO_4::1:1:1$ the resultant mass tends to be a thin slurry which gels in a relatively short period of time and the proportion of zirconium rendered soluble is of the order of 70%. In operating with acid strengths of the order of 60 to 80% the resultant mass is damp and is normally of a varying consistency of paste and the atack is to the extent of 70% of soluble zirconium. In the preferred operation of this invention the acid strength is between 80% and 98%. In this range of concentration the roasted material and acid are brought together and under conditions of good admixture and agitation during the initial period of reaction the resultant product is a comparatively dry friable mass which is readily dispersed in water. In this condition, the efficiency of attack on the zirconium content is above 80%.

The sulphated mass whether in the form of comparatively dry powder or in the form of a paste is allowed to cool and is then lixiviated with water to produce a solution containing 25 to 90 g./l. of zirconium calculated as $ZrO_2$. Whilst this operation may be conducted in a variety of ways it will be found convenient to make the water addition quickly, i.e. adding sufficient water to produce a concentration within the above range in a period of preferably not more than 15 minutes. Viscous conditions with their consequent complications are thereby avoided. The dissolution of the sulphated mass is preferably conducted under conditions of agitation which may be mechanical or by air injection. After addition of the water the temperature is preferably raised to 70 to 95° C. (if not already so elevated) and is held at this temperature for a period of 15 to 30 minutes, preferably with agitation in order to achieve maximum dissolution of the zirconium values. The solution obtained contains zirconium which is assumed to be in the form of zirconium sulphate $Zr(SO_4)_2$. Additionally, it may contain an alkali metal sulphate and an alkaline earth or magnesium sulphate and possibly other soluble impurities originating mainly from the ore.

In order to ensure optimum recovery of soluble zirconium values, the solution finally obtained should contain an excess of sulphuric acid over and above that theoretically necessary to form the salt, $Zr(SO_4)_2$. Such excess acid can be quantitatively assessed by postulating that the zirconium salt solution should, independently of the amount which combines with the alkali and alkaline earth or magnesium metals present, comply with an acid/$ZrO_2$ ratio of not less than 1.6. This condition is to be obtained by first ascertaining the zirconium oxide content in the roasted material which can be rendered soluble by acid attack. This quantity will be referred to as the "available" zirconium which may be determined by attacking the roast mass previously ground in a pestle and mortar with 4 times its own weight of concentrated sulphuric acid. After the reaction is complete, the mass is diluted with 5 times its weight of water, heated to 80–90° C. for 30 minutes, filtered and washed, the extract being analysed with respect to its zirconium content. The acid required for attack will be based on that required to react with the alkali, alkaline earth or magnesium and the available zirconium content of the roasted material, the latter being calculated on the basis of $Zr(SO_4)_2$ and to allow an excess of acid over and above this amount. While it is preferred that sufficient strong acid as, for example 91% $H_2SO_4$ be used in the sulphation of the roasted material to achieve an excess of acid in the zirconium salt solution corresponding to at least the above acid/$ZrO_2$ ratio it is within the scope of the invention to employ a lesser proportion (but not less than 50%) of strong acid in the strong acid attack and ultimately add a more dilute sulphuric acid during the lixiviation in quantity sufficient to obtain at least the minimum acid/$ZrO_2$ ratio in solution.

Further enhanced extraction of the zirconium values of the roasted material may be favoured by raising the temperature of the solution containing zirconium sulphate preferably to about 70–90° C. or, if necessary, to the boil, so as to accelerate solution.

The solution obtained by the above procedure will, as already indicated, vary in regard to the impurities present according to the raw material selected. In the preferred method of operation, the raw material zircon with additions of high quality alkaline reacting alkali metal and alkaline earth (or magnesium) compounds will yield on roasting, acid attack, and lixiviation with water, a solution which is substantially water white and free from discolouring impurities. This aqueous mixture after completion of extraction of the soluble zirconium values will normally contain some unattacked material which will be filtered or decanted, and in this form a zirconium solution is available for various purposes such as in coating pigments, e.g. titanium oxide and especially titanium oxide of the rutile type. It will be understood that this solution may be used alone or in addition to other agents for coating or other operations for which it is required.

We have described in some detail how the invention may be performed but it will be understood that the details may be varied. Thus, although a range of sulphuric acid concentrations for attacking the roasted material has been indicated, there are obviously other methods of attaining this result. Thus, for instance, sulphuric acid of strengths greater than 98% may be employed, i.e. oleum may be used but, under such conditions, it is desirable to make a small addition of water in order to accelerate the reaction and promote a high efficiency of zirconium extraction. Furthermore, instead of sulphuric acid there may be used other mineral acids such as hydrochloric acid or nitric acid.

The following examples are given for the purpose of further illustrating the invention:

*Example 1*

A zircon sand containing 56.4% $ZrO_2$; 42% $SiO_2$, was ground in a ball mill to a fineness passing 325 mesh sieve (ASTM) and consisting of material of particle sizes substantially within the range 2 to 12$\mu$ with little, if any, in excess of 25$\mu$. 183 grams of this ground ore was intimately mixed with 106 grams of anhydrous soda ash and 100 grams of calcium carbonate. The mixture was charged into a fireclay crucible and roasted at 950° C. for 4 hours during which period there was a loss of 23% by weight. At the end of this period the roasted material consisted of a soft friable mass which showed no evidence of sintering having occurred during roasting. This roasted material on cooling was discharged to a glass beaker and therein was treated with 425 grams of cold 91% sulphuric acid. The mass was mechanically agitated and immediately a vigorous reaction took place resulting in a temperature rise to 225° C. with evolution of steam and fume. During this period, i.e. as soon as the mass had attained the appearance of a damp powder, agitation was arrested. After standing for a period of half an hour the mass was allowed to cool and was found to be a compartively dry pulverulent mass containing the greater proportion of the zirconium in a water soluble condition. 1200 millilitres of cold water were added over a period of 5 minutes and the mixture was agitated. The temperature was raised to 80/90 C. and this was maintained for a period of 30 minutes. The slurry was thereafter filtered and the residue was washed with cold water, the washings and filtrate being combined to form a solution having a volume of 1225 mls. containing 68.4 g./l. of zirconium calculated as $ZrO_2$. The solution was water-white and the overall extraction of zirconium from the zircon ore amounted to 81.2%. This solution was used for the coating of rutile titanium oxide by neutralisation in situ.

*Example 2*

A zircon sand was ground in a ball mill to a fineness passing 325 mesh sieve (ASTM), as in Example 1. In this instance, the ground material had a particle-size substantially within the range 2 to 75$\mu$, with little, if any, in excess of 100$\mu$. 183 grams of this ground ore was intimately mixed with 106 grams of anhydrous soda ash and 100 grams of calcium carbonate. The mixture was roasted, as in Example 1, for 4 hours at 950° C. At the end of this period the roasted material consisted of a crisp mass and the product thus obtained gave, an analysis, a total zirconia content of 34.7%. This roasted material, when treated cold, with 425 grams of cold 91% sulphuric acid, under the conditions described in Example 1, provided a zirconium solution containing 74.5% soluble zirconia, calculated on the total quantity of zirconia present in the roasted material. The acid/$ZrO_2$ ratio of this solution was 2.69. In this example, the material obtained on roasting showed evidence of slight sintering which, however, was negligible. The example is an embodiment within the scope of the invention but it does show the desirability of selecting a ground zircon within the preferred particle-size range, as in Example 1, since otherwise there may be the tendency for the mixture to sinter during the roasting operation and there may also result a decreased yield of soluble zirconia.

*Example 3*

300 grams of the roasted cake used in Example 2 (total $ZrO_2$ content: 34.7%) was slurried in a glass beaker with 1560 grams of 25% w./w. sulphuric acid. During agitation, the temperature of the mixture was raised to 80/90° C. and this was maintained for 30 minutes. The suspension was thereafter filtered and the residue was washed with cold water, the washings and filtrates being combined to form a solution having a volume of 1700 mls. containing 43.4 g./l. of zirconium calculated as $ZrO_2$. The efficiency of extraction was 70.9% calculated on the total quantity of zirconia present in the roasted cake. The acid/$ZrO_2$ ratio of the solution obtained was 2.78. (Filtration was very slow and after standing for 2 hours at room temperature, the filtrate had set to a gel, which probably comprised colloidal silica.)

*Example 4*

A zircon sand was ground in a ball mill to a fineness passing 325 mesh sieve (ASTM) and having the particle-size characteristics specified in Example 2. 183 grams of this ground ore was intimately mixed with 31.8 grams of anhydrous soda ash and 170 grams of calcium carbonate corresponding to a molar ratio of zircon:calcium carbonate:sodium carbonate=1:1.7:0.3. The mixture was roasted as in Example 1, for 4 hours at 950° C. to yield a soft non-sintered product which had a total zirconia content of 37.3%. 300 grams of this roasted material was treated in a glass beaker with 425 grams of cold 91% sulphuric acid. On agitating the mass, a vigorous reaction ensued with evolution of steam and fume and the cold sulphated residue was lixiviated, while stirring, with 1200 ml. of cold water. The temperature was raised to, and maintained at, 80/90° C. for 30 minutes. The mixture was then filtered and the residue was washed with cold water, washings and filtrate being combined to form a solution having a volume of 1370 mls. containing 48.7 g./l. of zirconium calculated as $ZrO_2$. The efficiency of extraction was 59.6% calculated on the total quantity of zirconia present in the roasted cake.

*Example 5*

The procedure described in Example 1 was repeated to the stage where the roasted material was digested with sulphuric acid and a comparatively dry pulverulent mass was obtained.

The batch was divided into two equal parts and to one part 600 mls. of cold water was added, the mixture agitated, and the temperature raised to 80–90° C. and maintained for a period of 30 minutes. The slurry was thereafter filtered and the residue washed with cold water. The washings and filtrate were combined to form a solution which, on analysis, showed 83.3% $ZrO_2$ had been extracted from the ore.

By contrast the other part of the pulverulent mass was mixed with 600 mls. of cold water and the mixture was agitated for a period of 16 hours. It was subsequently filtered and the residue was washed with water as before. Operating thus in the cold it was found that only 64.4% $ZrO_2$ in solution had been extracted from the ore.

What is claimed is:

1. A process for the preparation of zirconium sulphate solutions from zirconiferous materials rich in silica, by forming a mixture of the finely divided material with at least one alkali metal compound selected from the group consisting of the oxides, hydroxides and carbonates of said alkali metal and with at least one compound selected from the group consisting of the oxides, hydroxides and carbonates of alkaline earth metals and of magnesium, roasting said mixture at a temperature below the sintering point thereof, sulphating the resultant product by digesting it with sulphuric acid of about 80% to about 98% strength, lixiviating the sulphated product with water and separating from the undissolved residue.

2. The process of claim 1 in which said digestion is effected with an amount of said sulphuric acid greater than that required to form zirconium sulphate $Zr(SO_4)_2$.

3. The process of claim 1 in which said digestion is effected with an amount of said sulphuric acid to provide an acid/$ZrO_2$ ratio by weight of at least 1.6 independently of the amount of acid which combines with the alkali metal and with the metal selected from the group consisting of alkaline earth metals and magnesium.

4. A process for the preparation of zirconium sulphate solutions from zirconiferous materials rich in silica, by forming a mixture of the finely divided material with at least one alkali metal compound selected from the group consisting of the oxides, hydroxides and carbonates of said alkali metal and with at least one compound selected from the group consisting of the oxides, hydroxides and carbonates of alkaline earth metals and of magnesium, roasting said mixture at a temperature below the sintering point thereof, digesting the resultant product with sulphuric acid of about 80% to about 98% strength in an amount adequate to render the zirconium values water-soluble, lixiviating with dilute sulphuric acid and separating from the undissolved residue.

5. The process of claim 4 in which the total amount of sulphuric acid employed is such as to provide an acid/$ZrO_2$ ratio by weight of at least 1.6 independently of the amount of acid which combines with the alkali metal and with the metal selected from the group consisting of alkaline earth metals and magnesium.

6. Process according to claim 1 in which the total proportions of the respective alkaline reacting compounds are stoichiometric chemical equivalents of the zirconia plus silica contents of the zirconiferous materials, assuming the formation of the meta-salts.

7. Process according to claim 1 in which the amount of the second mentioned alkaline reacting compound is from 0.2 to 1.8 stoichiometric equivalent to 1 equivalent of the zirconia plus silica contents of the zirconiferous material.

8. Process according to claim 1 in which zircon is the zirconiferous material and the amount of alkali metal, alkaline earth metal and zircon employed in the roasting mixture is stoichiometrically represented as $$Na_2O:CaO:ZrSiO_4 -::1:1:1$$

9. Process according to claim 8 in which the proportion of alkali metal and alkaline earth metal, is such that 0.1 to 1.9 molar parts of alkali metal compound is employed per the combined molar equivalent of zirconia and silica.

10. Process according to claim 4 in which the product of the acid treatment is lixiviated with water to produce a solution containing from 25 to 90 g./l. of zirconium calculated as $ZrO_2$.

11. Process according to claim 4 in which the lixiviation with water is effected at a raised temperature.

12. Process according to claim 11 in which the lixiviation is effected at a temperature of from 70 to 95° C.

13. Process according to claim 4 in which the lixiviation with water is effected with agitation.

14. Process according to claim 4 in which a strong acid is used for attacking the roasted product and in which during the lixiviation with water there is added a more dilute acid in a quantity sufficient to give, in all, a desired acid excess.

References Cited in the file of this patent

UNITED STATES PATENTS

| | | |
|---|---|---|
| 1,658,807 | Kinzie | Feb. 14, 1928 |
| 1,916,226 | Kinzie | July 4, 1933 |
| 2,294,431 | Wainer | Sept. 1, 1942 |

OTHER REFERENCES

Beyer et al.: "Caustic Treatment of Zircon Sand," United States Atomic Energy Commission, ISC 437 (Rev.), August 17, 1954, 15 pages.